Dec. 21, 1937.  A. M. COOK  2,103,215
PRESS FOR MOLDING SHAPED ARTICLES
Filed Sept. 30, 1936  3 Sheets-Sheet 1

Witness
Robert G. Trumbull

Inventor
ARNOLD M. COOK
By Clayton L. Jenks
Attorney

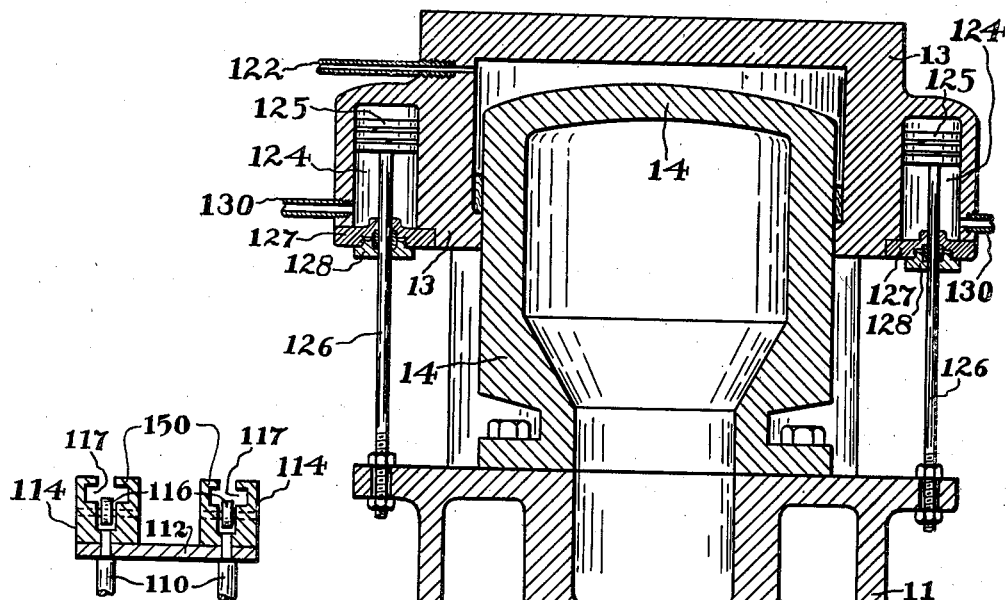
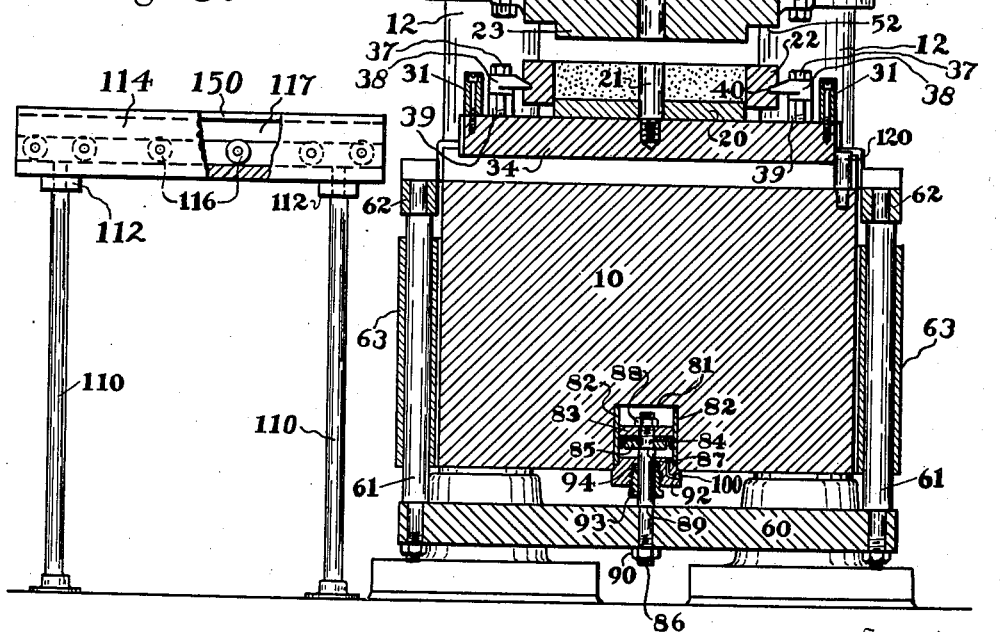
Fig. 6.
Fig. 2.

Patented Dec. 21, 1937

2,103,215

UNITED STATES PATENT OFFICE 2,103,215

PRESS FOR MOLDING SHAPED ARTICLES

Arnold M. Cook, Worcester, Mass., assignor to Norton Company, Worcester, Mass., a corporation of Massachusetts Application September 30, 1936, Serial No. 103,404

9 Claims. (Cl. 25—91)

This invention relates to hydraulic presses and more particularly to a press adapted for molding shaped bodies from suitable material.

In the manufacture of bricks, tiles, plates, grinding wheels and the like, it is customary to mold to the required shape a plastic mixture of suitable material and thereafter to treat the molded substance to convert it to a hard body. For example, a refractory article may be made of a mixture of crystalline alumina grains and a vitrifiable ceramic bond, which is fired after being molded to shape to vitrify the bond and form a unitary body. The ceramic mixture may be molded in an hydraulic press by placing the loose material in a mold band into which are inserted top and bottom press plates adapted to compress the material from both the top and the bottom as the plunger press is operated. In accordance with the prior art practice it has been customary heretofore to assemble the mold parts for use in the press as follows: The bottom press plate is laid on a flat set-up plate adapted to support the mold assembly and the mold band is initially supported in a raised position on the set-up plate by means of small blocks or shims which are adapted to be removed during the pressing operation and thus permit the mold band to move downwardly relative to the lower press plate. After the mold has been filled with the granular material to be molded and the top mold plate has been put into place, the mold assembly is placed in the press and a low pressure is applied to partially compress the mold material and to force the two press plates slightly into the mold band. Then the pressure is released and the shims or raising blocks are removed from under the band. Thereafter, the application of high pressure forces the top plate into the mold band and forces the latter downwardly until the two parts of the press contact with the top and bottom of the mold band and thus force the two press plates into it flush with its outer surfaces. Or, if desired, the mold plates need not be forced entirely into the band, as above described, but a definite pressure may be applied to compress the material to a desired extent. Thereafter, the mold is removed from the press and the press plates and mold band are carefully separated from the shaped article, and the latter is then ready for the firing operation or other step required for setting the molded article to a rigid condition.

The above method as heretofore practiced is slow and involves many manual operations which waste time and result in unnecessary expense, where an ordinary hydraulic press is employed for this special operation. It is the primary object of this invention to provide a special press construction which simplifies the molding operation and permits a given material to be molded rapidly and efficiently, and which will serve to produce a molded article of a satisfactory and substantially uniform structure throughout.

Another object is to provide a press for molding shaped articles by means of a mold band and two opposed press plates whereby the use of removable shims for supporting the band is avoided and yet the material may be pressed from both sides by the opposed plates moving under pressure into the mold band. Further objects will be apparent in the following disclosure.

In accordance with this invention, I provide a hydraulic press which has a mold carrier so arranged that during the molding operation the lower movable mold plate may be supported on a fixed portion of the press, while the mold band itself is yieldingly supported on a vertically movable part of the press, so that when pressure is applied, the material may be compressed and the mold band moved downwardly to the required extent in a single operation and without the use of shims as above described. This construction may also be so arranged that the mold carrier may be moved into and out of the press for convenience in loading the mold and removing the molded body therefrom.

Referring to the drawings which illustrate one embodiment of this invention:

Fig. 2 is a vertical elevation of the essential parts of the press and the associated loading table, with the mold and carrier in place within the press;

Fig. 6 is a sectional detail of the loading table.

Figure 1:
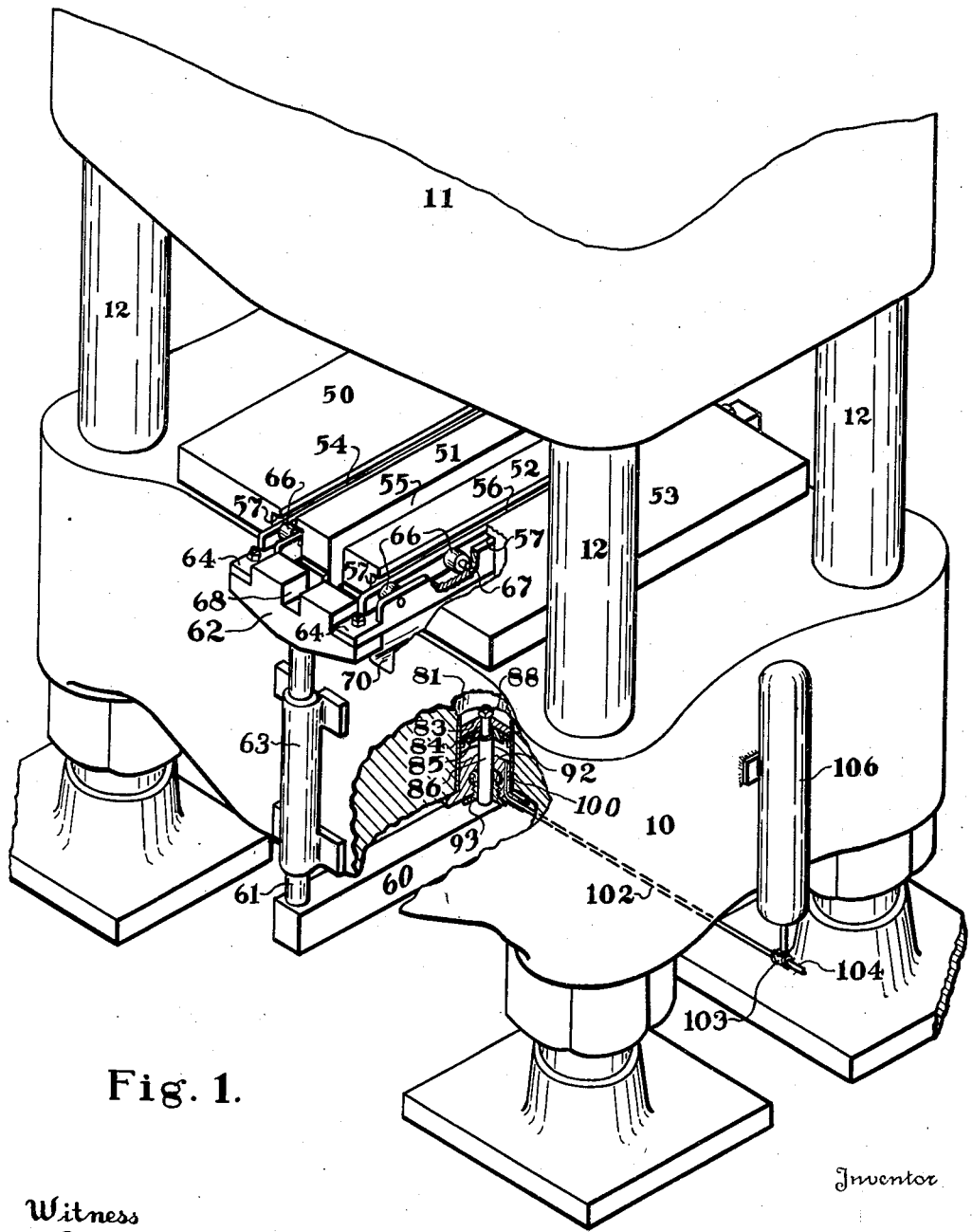
Fig. 1 is an isometric view of those features of the lower portion of a molding press which relate to the present invention, and in which various parts are shown broken away in order to illustrate structural details more clearly.

Except as herein described, the hydraulic press may be of any suitable and usual construction. For example, the press may have a stationary bed with a vertically movable platen located there-above or the stationary part of the press may be located above a lower vertically movable platen or the top and bottom platens of the press may be both movable. In the embodiment of the invention herein described, the lower platen is stationary and only the upper portion is movable. In this press, the bed 10 is a large casting which is especially shaped as hereinafter described to provide room for the horizontally movable mold carriage and the vertically movable elevator, as well as the hydraulic cylinder adapted to control the movement of the carriage. The upper movable platen 11 of the press is vertically guided by guide rods 12 which move through suitable guideways in the stationary bed 10, and the vertically movable platen is suitably moved by hydraulic mechanism comprising a stationary cylinder 13 and a vertically movable ram 14 which form the hydraulic unit for supporting and moving the platen which is suspended beneath the ram 14 by means of bolts or the like.

Figure 3:
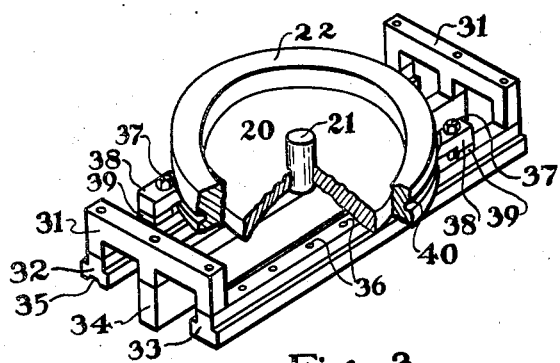
Fig. 3 is an isometric view partly broken away of the mold carrier and a mold with a lower mold plate assembled thereon.

As shown particularly in Figs. 2 and 3, the mold may comprise a bottom mold plate 20 provided with a central aperture through which projects a center pin 21 adapted to form a hole in the article to be shaped. The disk shaped bottom mold plate 20 fits slidably within the mold band 22 and an upper mold plate 23, which in the present instance is secured to the press platen 11, is adapted to be inserted in the mold band and to compress the material therein.

The mold is adapted to be secured on a carrier which is horizontally movable into and out of operative relationship with the press parts. It is preferably so arranged that it may be removed to a table at the side of the press for loading the mold. This carrier comprises, as shown particularly in Fig. 3, two E-shaped end frame pieces 31 which hold together two T-shaped side bars 32 and 33 and a center bar 34 in a parallel relationship. The side bars 32 and 33 constitute runners adapted to move over a set of rolls supported on the press and the outside table to permit easy movement of the carriage. One or both of these runners 32 and 33 may be provided with a groove 35 (shown only in the runner 32) which is so shaped as to fit the roller on which the carriage moves and thus properly locate the carriage and to guide it into the press. The three bars are secured to the end pieces by any suitable means, such as screws or bolts provided for the purpose.

The side bars 32 and 33 are each further provided with holes 36 tapped into its surface. These are adapted to carry clamping dogs which serve to hold a mold of any desired size suitably locked in position on the carrier. The clamping dogs 38 are held in place by means of screws 37 fitted into the tapped holes 36, and the height of each of these dogs may be adjusted to suit various thicknesses of mold bands by means of the blocks 39. The mold band is provided with an external groove 40 so located and arranged that the clamping dogs may fit against the bottom shoulder of that groove and thus secure the mold band tightly in place on the carriage rails 32 and 33. In this construction, the mold band is fixed in position on the carriage, but the plate is free to move relative to the band, as will be later described. The center pin 21 may be likewise threaded into a suitable hole in the central rail 34 so that this is likewise fixed relative to the mold band. The mold band is supported at the required distance above the rails by means of pins 42 which are removably fitted into the holes 36 (Fig. 5) in the outer rails. This leaves room for the lower press plate 20 to rest upon the rails and yet not be located in its final position within the mold band.

Figure 5:
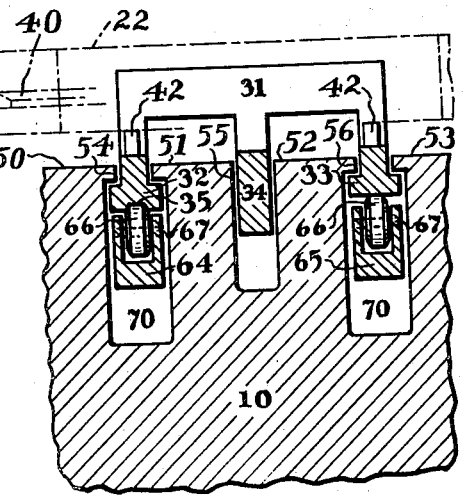
Fig. 5 is a sectional detail showing the mold band and the carrier on the supporting rollers within the press.

The lower bed or platen 10 of the press is especially constructed to provide space for a vertically movable device, herein termed an elevator, which yieldingly supports the mold carrier under the pressure applied thereto during the molding operation. To this end, the bed 10 is slotted and cut away, as illustrated in Figs. 1 and 5, so as to provide the stationary bed pieces 50, 51, 52 and 53 separated by the slots 54, 55 and 56 which are so shaped and arranged that the bottom rails 32, 34 and 33 respectively may enter these slotted portions and the tops of the carrier rails will thus be on the level of or slightly above the top surfaces 50, 51, 52 and 53 of the press bed 10. A set of overhanging shoulders 57 on the bed prevents the rails 32 and 33 from being dragged upwardly out of place.

Figure 4:
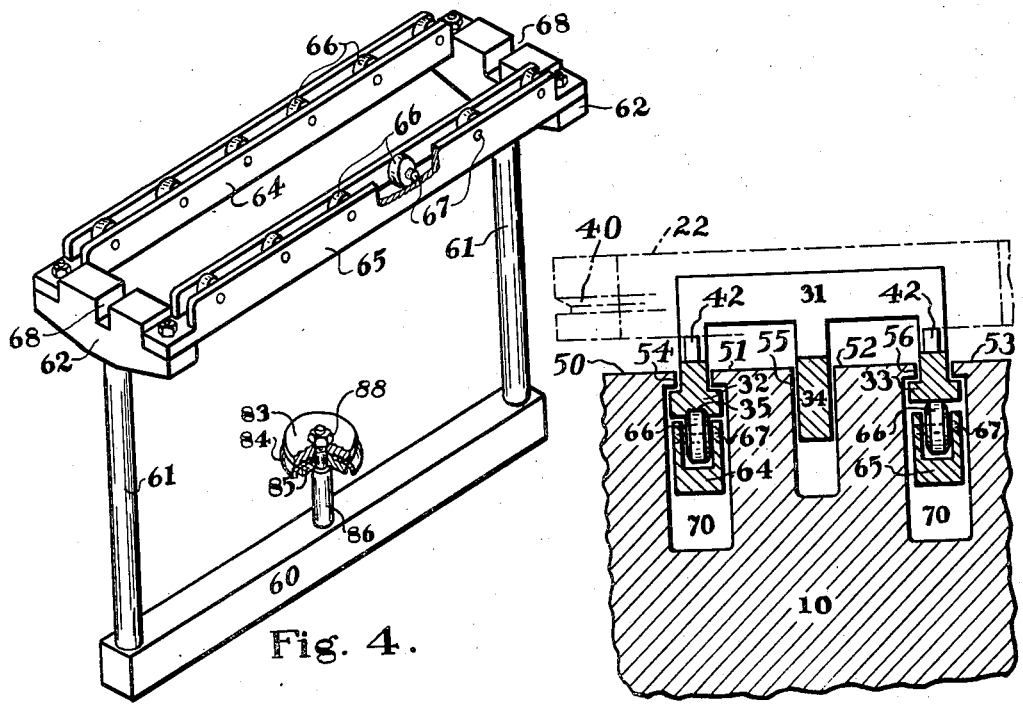
Fig. 4 is a similar isometric view, with parts omitted or broken away, which illustrates the carrier support and hydraulic piston adapted to resist yieldingly the pressure of the platen on the mold band.

The mold carrier is supported on an elevator which is shown particularly in Fig. 4. This elevator, in the present construction, comprises an equalizer bar 60 which passes beneath the press as illustrated in Figs. 1 and 2. Two vertical posts 61 are mounted on the ends of the bar and passed upwardly outside of the press. These support at their top ends the two cross bars or yokes 62 and are guided in a vertical movement by the sleeves 63 secured on the outside of the press bed 10. These two yokes 62 support in parallel relationship the two roller supports 64 and 65, each of which is a substantially U-shaped bar adapted to carry a set of rollers 66 suitably mounted thereon, as by means of pins 67 passing through openings in the vertical sides of each of these U-bars 64 and 65. The operative surface of each roller projects slightly above the tops of the bars, and these rollers are adapted to support the rails 32 and 33 (Fig. 3) of the carriage and thus permit the latter to be moved readily back and forth. Each yoke 62 is provided with a slot 68 through which the rail 34 is adapted to ride and thus further aid in guiding the carriage movement within the press. The flanged ends of the roll supports 64 and 65 are suitably secured, as by means of bolts, to the yoke 62 and thus provide a rigid structure thereof. The slots 54 and 56 in the press bed are sufficiently deep so as to provide a clearance space 70 (Figs. 1 and 5) for the elevator side bars 64 and 65 to move vertically to a required extent.

It will now be apparent that when the carrier rails 32 and 33 are moved into position on top of the rollers 66 of the elevator, and the mold is suitably located so that the upper press platen 23 may fit within the mold band and compress the material therein, then as the upper press platen is moved downwardly and begins to compress the material it will at once press indirectly upon the lower mold plate 20 supported on the carrier rails 32 and 33 and above the stationary bed 10. This mold plate 20 is located directly above the central stationary portions 51 and 52 of the bed; hence any downward movement of the mold, which is permitted by the elevator as later described, will cause the plate to rest in a fixed position on the press. Also, when the shoulder 52 (Fig. 2) of the upper press platen strikes the mold band 22, the band will move downwardly into a similar engagement with the press bed.

The clamping dogs and the supporting blocks 39 and pins 42 are not wider than the carrier rails and so do not obstruct the movement of the rails into the slots of the bed. This downward movement of the mold carriage is permitted by means of suitable mechanism, such as a fluid pressure device or springs which are provided to give a yielding but resisting pressure to the elevator and carriage supported thereon. This mechanism is to permit the mold band to move down only slowly as the pressure is applied and thus force the two mold plates to enter the mold band from the opposite sides while the mold band is yieldingly moving downwardly.

In order to provide this yielding movement of the elevator under the pressure of the upper press platen, I preferably provide a fluid pressure mechanism therefor, and this may comprise an hydraulic cylinder within the base 10 of the press, or which may be if desired suitably located outside of the press. In the embodiment illustrated, this hydraulic mechanism comprises a cylindrical hole 81 (Fig. 1) formed in the bed of the press and lined with a liner 82 within which is slidably fitted a piston 83 provided with any suitable packing 84 and a retainer 85. The piston carries a piston rod 86 secured to it in any approved manner. As shown, it has a shoulder 87 which engages the packing retainer 85 and a nut 88, which secure the parts together. The opposite end of the piston rod passes through the equalizer bar 69 and is secured thereto by a shoulder 89 and nut 90. The lower end of the cylinder is provided with a gland 92, a bushing 93 and packing 94 of suitable construction for the purpose.

In order to apply a yielding pressure to the piston so as to resist the downward thrust of the press platen and the weight of the mold carriage and elevator, fluid under pressure, such as water or air, may be introduced into the chamber beneath the piston to resist this downward pressure. For this purpose, a water passage 100 is provided through the gland 92 which is arranged to introduce water into a piston chamber. This passage in turn communicates with a pipe 102 (Fig. 1) which connects through a T 103 with an outside source of water under a suitable pressure entering the pipe 104 and further with an air pressure reservoir. The latter may comprise a closed cylinder 106 having air under pressure held in its top portion and compressed by the water therebeneath. This pressure is increased by the downward movement of the elevator. It will now be apparent that by applying a suitable water pressure to support this lower hydraulic piston, the elevator may be held up in place and will support the carriage with a resisting pressure which may be predetermined in accordance with the requirements of the pressing operation. When the press platen 11 moves downwardly and applies force against the elevator, the water in the piston chamber is forced back through the constant pressure pipe 104 and into the chamber 106 where the air is further compressed, which thus permits a yielding downward movement of the elevator. Upon release of the platen pressure the air in the cylinder 106 and the constant water pressure applied to the pipe 104 forces the elevator upwardly. If desired, a valve in the pipe 104 may be closed and thus permit the air under pressure in cylinder 106 to act alone in controlling the movement of the elevator.

In order that the mold may be readily loaded outside of the press, any device, such as a table, may be adapted for this purpose. The construction illustrated in Fig. 2 comprises standards 110 adapted to support side bars 112, which may be constructed similarly with the upper portion of the elevator. This may comprise as shown in Fig. 6 two U-shaped side bars 114 arranged to support rollers 116 with their tops in substantially the same horizontal plane as that of the tops of the rollers 66 located within the press. The rails are shaped to provide spaces 117 within which the carriage rails 32 and 33 may move after they leave the rollers of the press and pass onto the rollers of the table. At the back of the press as shown in Fig. 2 is a stop pin 120 mounted on a fixed part thereof and arranged to permit the mold carriage to move inwardly only to a certain point and thus be in proper location relative to the press platen.

The operating mechanism of the press may be as desired. For example, water introduced under pressure through the pipe 122 to the chamber within the stationary cylinder 13 (Fig. 2) will force the platen 11 downwardly. In order to raise the platen and its piston 14, two auxiliary hydraulic devices may be provided. These may comprise piston chambers 124 suitably formed within the walls of the casing 13 or attached thereto. Within these chambers, pistons 125 are slidably mounted and adapted to support by means of the connecting piston rods 126 the platen 11 therebeneath. The removable heads 127 and glands 128 with suitable packing form piston chambers beneath the pistons into which water under pressure is introduced by means of pipes 130. By a suitable control of valves in the pipes 122 and 130 the platen may be raised and lowered. Any desired mechanisms may of course be combined with or substituted for the parts here described.

The operation of the device will be apparent in view of the above disclosure. The mold carriage is first located on the table outside of the press with the mold band 22 clamped properly in position thereon, as has been previously determined with reference to the stop pin 120 and the press platen 23. The bottom mold plate 20 lies on the carriage rails 32 and 33; and the mold band is clamped in its raised position on the supporting pins 42. When the material to be molded has been placed in the mold and leveled off and otherwise suitably treated as is required, the mold carriage is moved into proper location beneath the press platen. Then the upper platen or plunger 11 is moved downwardly to force the top mold plate 23 into the mold band. The elevator which carries the rollers 66 is initially so located that the carriage may be moved into place without the bottom plate dragging on the stationary bed of the press, and this clearance need be only a small fraction of an inch. As pressure is applied to the material, the carriage and elevator move downwardly as permitted by the yielding hydraulic pressure in the pressure main 102, and the bottom mold plate 20 first strikes the stationary parts 51 and 52 of the bed and thus is held rigidly thereby. The carriage and mold band, however, under the downward drag of the granular material being molded tend to move downwardly slowly. When the shoulder 52 (Fig. 2) of the press platen strikes the mold band, the latter is forced positively downwardly until it strikes the fixed bed 10. The upper plate 23 has likewise been entering the mold and when both plates have been forced entirely into the band, the mold is closed and the pressing operation at an end. The press may be so operated that the mold need not be entirely closed, or in other words the material may be pressed under a given pressure, irrespective of the extent of movement of the mold plates.

It will be understood that the pressure applied to the main cylinder 13 will be so regulated as to insure the downward movement of the elevator. Since the lower hydraulically operated piston 83 is always under pressure from the air cylinder and the outside water main, the operation of the carriage elevator will be entirely automatic and the carrier and mold band will return to their original positions as soon as pressure on the top mold band is released by moving the press platen 11 upwardly. Hence, the carriage is then in position for removal from the press for a further unloading and loading operation.

In view of the above disclosure, it will now be appreciated that other constructional features may be embodied in this press as desired, and that numerous modifications may be made which incorporate the primary features of this invention. The above description and the drawings are therefore to be construed as illustrative of one embodiment of the invention and not as limitations thereon.

The scope of the invention is set forth in the following claims, wherein I claim:

1. A power press for molding shaped articles comprising two press platens, power mechanism for moving one of the platens towards the other, an elevator adapted to hold a mold between the platens and means for yieldingly supporting the elevator against the pressure of the movable platen.

2. A power press for molding shaped articles comprising two press platens, power mechanism for moving one of the platens towards the other, an elevator associated with one of the platens which is arranged to hold the relatively movable parts of a pressure mold between the platens, and fluid pressure mechanism which yieldingly supports the elevator and resists the pressure of the platen during a molding operation.

3. A power press for molding shaped articles comprising a bed and a power operated platen which are relatively movable towards each other to press moldable material therebetween, an elevator which is movable relative to the press bed and is adapted to support a pressure mold, pressure mechanism adapted to yieldingly support the elevator and resist the pressure of the press platen, said bed and elevator being so constructed and arranged that the bed may support one mold part while another is yieldingly movable with the elevator.

4. A press for molding material in a mold having a band and relatively movable pressure plates insertable therein comprising a bed and a fluid pressure operated platen which are relatively movable towards each other, an elevator which is movable relative to the press bed, said bed and elevator being so constructed and arranged that the elevator may support the mold band while the press bed supports a mold plate and thus allows relative movement therebetween, and pressure mechanism adapted to support the elevator yieldingly as the press platen compresses the material within the mold.

5. A power press for pressing material within a mold having a mold band and top and bottom pressure plates insertable therein, comprising a relatively movable bed and platen, fluid pressure mechanism for causing such relative movement, a mold carrier movable into and out of operative relationship with the platen, means for supporting the mold carrier outside of the press and means including rollers adapted to support the mold carrier and mold within the press during a pressing operation.

6. A power press for pressing material within a mold having a mold band and top and bottom pressure plates comprising a relatively movable press bed and platen and power mechanism for causing such relative movements, an elevator arranged for vertical movement relative to the press bed, a movable mold supporting carriage mounted on said elevator in operative relationship with the platen, fluid pressure mechanism yieldingly supporting the elevator and adapted to apply a restraining pressure which permits a gradual downward movement of the mold band under the pressure of the press platen and means on the press bed which may rigidly support the lower plate of the mold as the mold band is yieldingly supported on the elevator.

7. A power press for pressing material in a mold having a mold band and relatively movable pressure plates comprising a stationary bed, a fluid pressure operated press platen movable vertically thereabove, a horizontally movable mold carriage, an elevator supporting the carriage and mounted for vertical movement relative to the press bed, and fluid pressure mechanism adapted to yieldingly restrain such movement under the pressure of the press platen, said bed being cut away to provide free space within which the elevator and carriage may move downwardly under the pressure applied to the mold band while a further portion of the stationary bed engages the lower press plate and restrains its movement while the material is being compressed.

8. A power press of the type covered by claim 5 wherein a stationary table located at one side of the press bed has rollers aligned with the rollers on the elevator and so arranged that the carriage may be moved laterally before and after a pressing operation for filling and unloading the mold.

9. A power press of the type covered by claim 6 in which the fluid pressure mechanism comprises a piston connected to the carriage and a cylinder carried by the stationary bed and connections for admitting fluid under pressure to the cylinder and yieldingly supporting the elevator.

ARNOLD M. COOK.